United States Patent [19]

Couturier et al.

[11] 4,039,751
[45] * Aug. 2, 1977

[54] METHOD AND APPARATUS FOR CLOSED LOOP TESTING OF FIRST AND SECOND MODULATORS AND DEMODULATORS

[75] Inventors: Robert A. Couturier, Stamford; Steven J. Davis, Ridgefield; G. Howard Robbins, New Canaan, all of Conn.

[73] Assignee: General Datacomm Industries, Inc., Wilton, Conn.

[ * ] Notice: The portion of the term of this patent subsequent to Apr. 20, 1993, has been disclaimed.

[21] Appl. No.: 668,990

[22] Filed: Mar. 22, 1976

Related U.S. Application Data

[60] Continuation-in-part of Ser. No. 554,773, March 3, 1975, Pat. No. 3,952,163, which is a division of Ser. No. 246,589, April 24, 1972, Pat. No. 3,869,577.

[51] Int. Cl.² .............................................. H04B 3/46
[52] U.S. Cl. ............................. 179/15 BF; 179/175.3 R
[58] Field of Search ........ 179/15 BF, 2 DP, 175.3 R, 179/175.3 F, 175.31 R

[56] References Cited

U.S. PATENT DOCUMENTS

| | | | |
|---|---|---|---|
| 2,840,797 | 6/1958 | Derr | 325/2 |
| 2,864,942 | 12/1958 | Drake | 325/25 |
| 2,864,943 | 12/1958 | Schultz | 325/3 |
| 2,871,289 | 1/1959 | Cox et al. | 340/146 ER |
| 3,049,692 | 8/1962 | Hunt | 340/146.1 |
| 3,508,018 | 4/1970 | Orne | 179/175.3 R |
| 3,622,877 | 11/1971 | MacDavid et al. | 324/73 R |
| 3,636,280 | 1/1972 | Wetzel | 179/175.3 R |
| 3,655,915 | 4/1972 | Liberman et al. | 179/175.3 R |
| 3,692,939 | 9/1972 | Knight et al. | 179/175.3 R |
| 3,743,938 | 7/1973 | Davis | 325/67 |
| 3,769,454 | 10/1973 | Liberman et al. | 179/175.3 R |
| 3,952,163 | 4/1976 | Couturier et al. | 179/175.3 R |
| 3,956,601 | 5/1976 | Harris et al. | 179/175.3 R |
| Re. 27,864 | 1/1974 | Davis | 179/2 DP |

OTHER PUBLICATIONS

Brochure on Sanders Modem Tester, Model 101.

Primary Examiner—Douglas W. Olms
Attorney, Agent, or Firm—Pennie & Edmonds

[57] ABSTRACT

A method and apparatus are disclosed for closed loop testing of first and second modulators and demodulators from the modulated signal side of the first modulator and first demodulator. During ordinary communication, the first modulator and second demodulator are connected in series and the first demodulator and the second modulator are connected in series. In response to each test initiate signal, a loop is established between the second modulator and the second demodulator on their modulated signal side. Upon reception of some test initiate signals, a loop is established between the first modulator and first demodulator on their demodulated side and they are disconnected from the second demodulator and second modulator. Thus, the first modulator and demodulator can be tested from their modulated signal side when a loop is established between them; and the first and second modulators and demodulators can be tested when a loop is established between the second modulator and demodulator but not between the first modulator and demodulator.

16 Claims, 2 Drawing Figures

METHOD AND APPARATUS FOR CLOSED LOOP TESTING OF FIRST AND SECOND MODULATORS AND DEMODULATORS

BACKGROUND OF THE INVENTION

This is a continuation-in-part of U.S. application Ser. No. 554,773, Pat. No. 3,952,163 filed 3-3-75, entitled "Method and Apparatus for Control Signaling in FDM System", which is a division of U.S. application Ser. No. 246,589, filed 4-24-72, now Pat. No. 3,869,577 which is hereby incorporated by reference.

This applications concerns a method and apparatus for testing a communication system.

A specific use for our invention is in private line data networks in which several remote terminals are connected over narrow band private lines to a central processing unit (CPU). Such a system typcially is used in conjunction with a public telephone network, such as that of the Bell System, to provide groups of telephone subscribers in each of several localities with low-cost, long-distance data links to a centrally located computer. Thus, the whole system comprises a multitude of subscriber telephone and data sets, a public telephone network, several remote terminals, a private line network, and a central processing unit.

As is well known, data is transmitted over conventional public telephone networks in the form of pulses of certain frequencies. At the transmitter, a modulating device called a data set, or modem, is used to covert a DC signal representative of a stream of digital data, which may be received from any type of digital data processing machine, into an AC signal representative of this same stream of digital data. At the receiver, another modem converts received AC signals back to digital DC signals. Ordinarily, data communication takes place in both directions on a telephone line and each modem is equipped both to convert DC signals to AC signals that are transmitted and to convert received AC signals to DC signals. Thus, in a typical data communication system, each subscriber has at least one modem transmitter/receiver and each remote terminal of a private line data network has at least one modem transmitter/receiver.

In modems that are presently used with data communication systems, one of the two DC levels that represents digital data is converted by a modem to an AC signal having a first frequency while the other level of the DC signal is converted to an AC signal having a second frequency. It is conventional in the art to refer to one of these DC levels and the corresponding AC frequency as a SPACE or 0, and to the other DC level and the corresponding AC frequency as a MARK or 1. To minimize interference between signals that are transmitted from a terminal and the signals that are received at that terminal and to permit communication between more than two terminals, it is customary for a modem to transmit MARK and SPACE signals at frequencies that are centered about a first center frequency and to receive MARK and SPACE signals at frequencies that are centered about a second center frequency.

Extensive description of the operation of modems may be found in James Martin's book *Telecommunications and the Computer,* (Prentice Hall, 1969); in U.S. Pat. No. 3,769,454 to R. A. Liberman, W. C. Bond, and E. J. Soltysiak, entitled "Method and Apparatus for Testing Teletypewriter Terminals", and assigned to General Data-Comm Industries, Inc.; and in the Bell System Data Communications Technical Reference entitled "Characteristics of Teletypewriter Exchange Service", (September, 1970) available from: Engineering Director — Data Communications, American Telephone and Telegraph Company, 195 Broadway, New York, N.Y. 10007.

Data is transmitted over the private line portion of the data communication network by methods such as frequency division multiplexing (FDM) that allow several phone calls to be conducted simultaneously over a single private line. In an FDM system, this is accommplished by transmitting each call within a specified frequency channel on the private line. At the remote terminal, an FDM transmitter/receiver converts DC signals from the remote terminal modem to signals having frequencies within the specified frequency channel; and it converts signals received from the CPU to DC signals that are applied to the remote terminal modem. A second FDM transmitter/receiver, which may be termed a local FDM, is located adjacent to CPU. This local FDM transmitter/receiver converts signals received from the remote FDM to DC signals that are applied to the CPU; and it also converts signals from the CPU to signals having frequencies within the frequency channel assigned for transmission to to the remote FDM. The local FDM also performs interfacing required between the data communication system and the CPU. Extensive discussion of frequency division multiplexing may be found in the above-referenced *Telecommunications and the Computer.* As will be evident to those skilled in the art, the modulating and demodulating functions of an FDM transmitter/receiver are analogous to those of a modem.

SUMMARY OF THE INVENTION

To provide for testing of both the modem and the transmitter/receiver in the remote terminal, as well as the testing of similar types of communication equipmnt, we have devised a method and apparatus for creating testing loops between the modulator and demodulator of the remote terminal modem and between the modulator and demodulator of the transmitter/receiver. These test loops are established in response to signals transmitted from the modulated signal side of the transmitter/receiver. Upon reception of each signal to initiate a test, a test loop is established between the modulator and demodulator of the modem on their modulated signal side. Upon reception of some such signals, a loop is established between the modulator and demodulator of the transmitter/receiver on their demodulated side and they are disconnected from the modem. Thus the transmitter /receiver can be tested from it modulated signal side when a loop is established between its modulator and demodulator; and both the transmitter/receiver and the modem can be tested when there is a loop between the modulator and demodulator of the modem but not between the modulator and demodulator of the transmitter/receiver.

As will be evident, similar loops can be established in other communication apparatus using two sets of modulators and demodulators.

BRIEF DESCRIPTION OF THE DRAWING

These and other objects, features, and elements of our invention will be more readily apparent from the following detailed description of the drawing in which.

DETAILED DECRIPTION OF THE INVENTION

Figure 1:
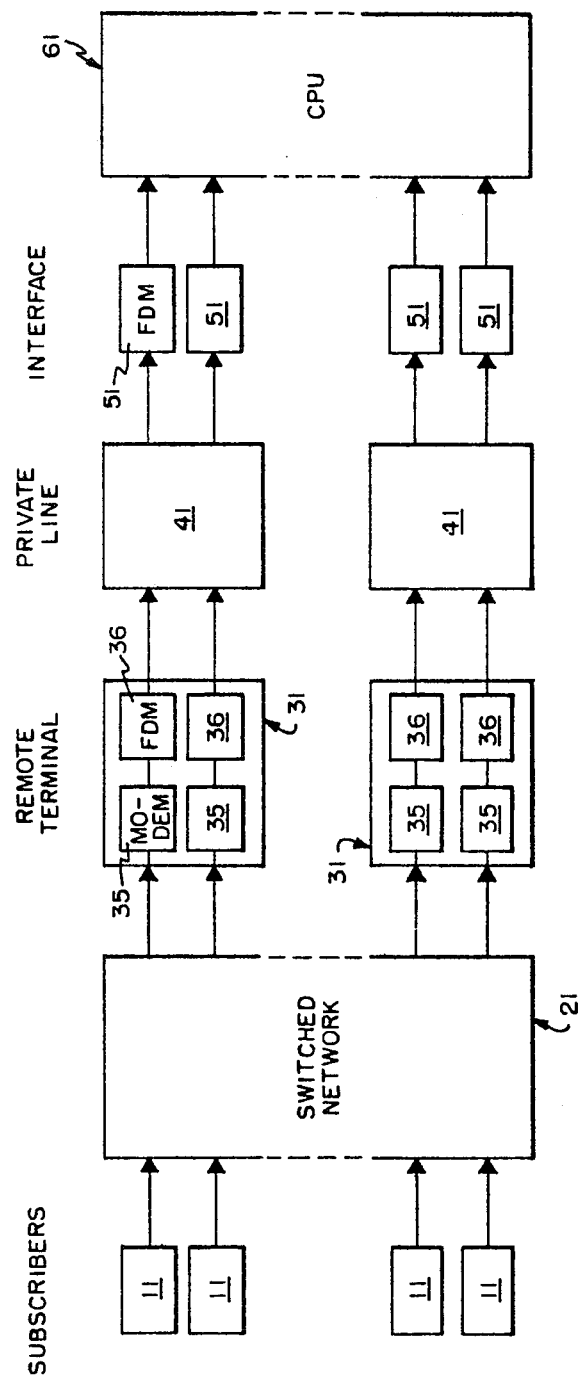
FIG. 1 is a block diagram of a typical communication system in which our invention may be used.

FIG. 1 illustrates a typical communication system in which our invention may be used. In this system, a multitude of subscriber stations 11 are connected by means of a public telephone network 21 to several remote terminals 31. The remote terminals 31 are connected by private lines 41 and FDM transmitter/receivers 51 to a central processing unit (CPU) 61. Typically, each subscriber station 11 has a telephone set and a modem. Each remote terminal 31 contains at least one pair of a modem 35 and an FDM transmitter/receiver 36.

This arrangement of apparatus permits each of several subscribers in one locality to be connected simultaneously with a different modem 35 in the same remote terminal 31 and to communicate with CPU 61 over the same private line 41. Because different frequency channels are used in private line 41 for each subscriber's communication, there is no interference between the subscribers under normal operating conditions. Simultaneously, other subscribers in other localities may also be connected with CPU 61 by means of other remote terminals 31 and private lines 41.

The telephone sets and modems used in our invention are conventional. They may for example be standard Bell System telephones and 103-type modems such as those now made by several manufacturers. The FDM transmitter/receivers 36, 51 contain conventional FDM transmitting and receiving equipment. The operation of a communication system such as that of FIG. 1 is detailed in U.S. Pat. No. 3,869,577, entitled "Method and Apparatus for Control Signaling in FDM System".

We have discovered that both modem 35 and FDM transmitter/receiver 36 of remote terminal 31 may be tested automatically by apparatus similar to that disclosed by S. J. Davis in U.S. Pat. No. 3,743,938 entitled "Closed Data Loop Test Apparatus for Data Transmission Modem" and by apparatus similar to that disclosed by R. A. Liberman and S. J. Davis in U.S. Reissue Pat. No. Re. 27,864 entitled "Closed Loop Test Method and Apparatus for Duplex Data Transmission Modem", both of which patents are hereby incorporated by reference. It will be understood by those skilled in the art that modem 20 of U.S. Pat. No. 3,743,938 corresponds to the remote FDM transmitter/receiver 36 described above and that modem 20 of U.S. Reissue Pat. No. Re. 27,864 corresponds to remote modem 35 described above.

Figure 2:
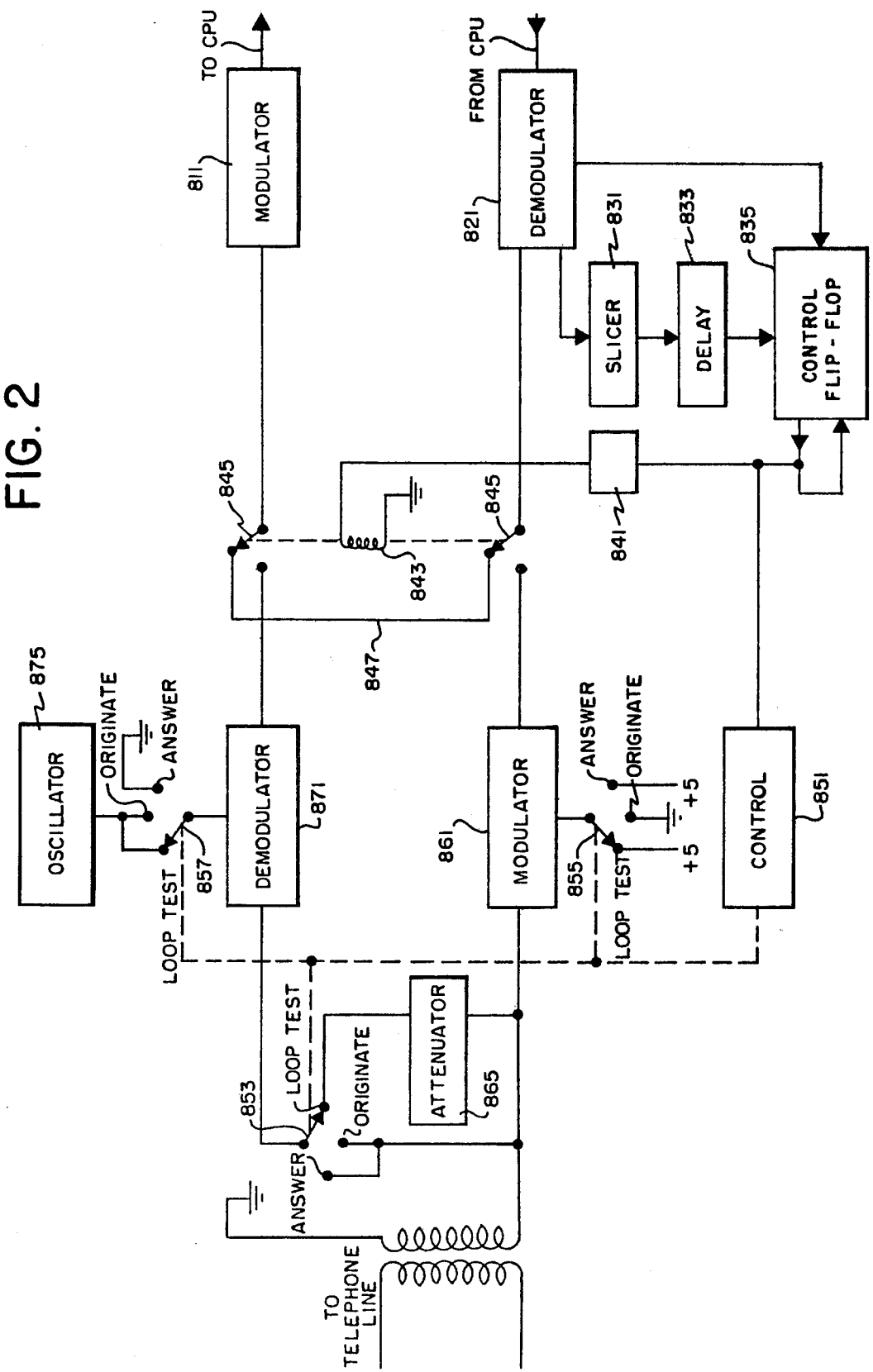
FIG. 2 is a block diagram of illustrative testing circuitry in a remote terminal of our invention.

Testing of both the modem and the FDM in the remote terminal may be accomplished automatically by inserting a counter between Remote Dataloop Respond Control flip-flop 61 and solenoid 62 of FIG. 2 of U.S. Pat. No. 3,743,938 and by connecting loop test terminal 78 of FIG. 2 of U.S. Reissue Pat. No. Re. 27,864 to a point between this counter and Remote Dataloop Respond Control flip-flop 61. A remote terminal in which this is done is illustrated schematically in FIG. 2. This terminal comprises a first modulator 811 and a first demodulator 821 that correspond to a remote FDM transmitter/receiver 36 of FIG. 1 and a second modulator 861 and a second demodulator 871 that correspond to the transmitter and receiver of the remote terminal modem 35 of FIG. 1.

To begin a test of the remote terminal FDM transmitter/receiver and modem in our invention, a center frequency signal must be detected at demodulator 821 for at least two seconds. To detect this two-second center frequency signal, a slicer 831, a delay device 833, and a control flip-flop 835 are connected to demodulator 821. This apparatus corresponds to modem receiver 20A, slicer 55, integrator 56, and a Dataloop Respond Control 61 of U.S. Pat. No. 3,743,938 and operates in the fashion described therein.

The output of control flip-flop 835 is an ON-OFF signal that is applied to a control means 851 and a counter 841. The output of counter 841 is applied to a solenoid 843 that controls the position of a double-pole, double-throw switch 845. As shown in FIG. 2, in its test position switch 845 closes data test loop 847 and simultaneously disconnects the input terminal of modulator 811 and the output terminal of demodulator 821 from demodulator 871 and modulator 861.

In response to an ON signal from control flip-flop 835, control means 851 establishes a test condition in the second modem. In this condition, a test loop is connected from the output terminal of modulator 861 through attenuator 865 to the input terminal of demodulator 871 and modulator 861 is forced to operate in one of the answer or originate modes while demodulator 871 operates in the other. The test loop is established by a switch 853 that interconnects the output of modulator 861 to the input of demodulator 871 via attenuator 865. Modulator 861 is caused to operate, for example, in the answer mode by using switch 855 to apply to it the same voltage that is used for the answer mode. This voltage controls the frequency of an oscillator (not shown) in modulator 861. Demodulator 871 is caused to operate in the originate mode by using switch 857 to apply to it the same frequency from oscillator 875 that is used for the originate mode. Further details on this portion of the remote terminal are set forth in U.S. Reissue Pat. No. Re. 27,864. As will be apparent upon examination of that patent, considerable apparatus described therein has been left out of FIG. 2 for purposes of clarity.

To test the remote terminal of FIG. 2, a two second center frequency signal is applied from the CPU. This produces an output from control flip-flop 835 that latches in the ON state. This output is a test initiate signal which is applied to control means 851 to cause it to establish a test condition by closing the test loop through attenuator 865, switching modulator 861 to the answer mode and switching demodulator 871 to the originate mode. As long as a carrier signal is detected in demodulator 821, the output of control flip-flop 835 remains latched in the ON state that causes this test condition. When the carrier signal fails, a reset signal is generated that resets control flip-flop 835, changing its output to the OFF state and causing control means 851 to move switches 853, 855 and 857 out of the test condition to normal operation.

Each ON-OFF cycle of the output of control flip-flop 835 is counted by counter 841. For every other ON signal output from control flip-flop 835, the output of counter 841 is such that it closes test loop 847. Because the closing of test loop 847 disconnects modulator 861 and demodulator 871, only modulator 811 and demodulator 821 are available for testing when test loop 847 is closed. As a result, both the first and second modulators and demodulators are connected to the CPU for testing during one ON signal output from control flip-flop 835; and just modulator 811 and demodulator 821 are so connected during the next ON signal. This makes it possible to isolate some malfunctions in the data communication system.

As will be evident, our invention may be practiced in many different ways. Numerous other signals than a two-second center frequency signal and carrier signal failure can be used to produce the test initiate and reset signals. For example, in an FDM system, special frequency tones can be used to trigger these two signals. Appropriate apparatus to detect these tones and produce the test initiate and reset signals will be evident.

Although the invention has been described in terms of an FDM system, it will be recognized that its principles can be applied to any modulation system, for example, a pulse code modulation (PCM) system or an amplitude modulated system, and could be used in a voice communication system as well as a data communication system. In addition, the invention can be used with any type of modulator and demodulator in addition to the modem and transmitter/receiver described above. For example, while the detailed description is directed to a modem that transmits and receives on different frequencies and therefore has answer and originate modes of operation, our invention may also be practiced with a modem that transmits and receives on the same frequency. In such as case it is only necessary to establish a test loop on the modulated signal side of the modem and it is not necessary to put the modulator and demodulator of the modem into different modes of operation since they operate on the same center frequency. It should also be noted that it may not be necessary in some applications to attenuate the modulated signal coupled between the modulator and demodulator of the modem. Many other devices will be apparent that can be used in place of counter 841 to connect the first modulator and first demodulator in response to only a portion of the test initiate signals from control flip-flop 835. In general, one can use any multistate device that can be stepped through at least two different output states in response to a sequence of signals applied to its input.

It will be apparent to those skilled in the art that numerous other modifications may be made to the preferred embodiment described and illustrated herein without departing from the invention as defined in the claims.

What is claimed is:

1. In a communication terminal comprising:
   a first modulator with an input terminal for receiving a signal and an output terminal to which is supplied a modulated signal representative of said signal at its input terminal;
   a first demodulator with an input terminal for receiving a modulated signal and an output terminal to which is supplied a signal demodulated from said modulated signal;
   a second modulator having an input termianl for receiving a signal and an output terminal to which is supplied a modulated signal representative of said signal at its input terminal, said input terminal being connected to the output terminal of the first demodulator; and
   a second demodulator with an input terminal for receiving a modulated signal and an output terminal to which is supplied a signal demodulated from said modulated signal, said output terminal being connected to the input terminal of the first modulator;
   a method of closed loop testing the operation of said modulators and demodulators from the modulated signal side of the first modulator and first demodulator comprising:
   sensing a first signal supplied to the first demodulator and producing in response thereto a test initiate signal;
   connecting the output of the second modulator to the input of the second demodulator in response to said test initiate signal;
   connecting the output terminal of the first demodulator and the input terminal of the first modulator while disconnecting the first modulator and the first demodulator from the second demodulator and second modulator, said connecting and disconnecting occurring in response to an additional test initiate signal; and
   sensing at least one additional signal supplied to the first demodulator and in response thereto restoring the terminal to normal operation.

2. The method of claim 1 wherein the communication terminal is part of a frequency division multiplex (FDM) system and the first modulator and first demodulator are an FDM transmitter/receiver.

3. The method of claim 1 further comprising the steps of:
   operating the second modulator in one of the originate or answer modes in response to said test initiate signal; and
   operating the second demodulator in the other of said originate or answer modes in response to said test initiate signal.

4. The method of claim 1 further comprising the step of attenuating the signal connected from the output of the the second modulator to the input of the second demodulator.

5. The method of claim 1 wherein said first signal is a particular tone signal and said additional signal is an interruption in signals applied to the first demodulator.

6. The method of claim 1 further comprising the steps of applying the test initiate signals to a multistate recording means and controlling the connection of the output terminal of the first demodulator and the input terminal of the first modulator in response to the state of the recording means.

7. The method of claim 1 wherein the connecting of the output terminal of the first demodulator and the input terminal of the first modulator occurs in response to every other test initiate signal.

8. The method of claim 1 where the comunication terminal is a data transmission terminal.

9. In a communication terminal comprising:
   a first modulator with an input terminal for receiving a signal and an output terminal to which is supplied a modulated signal representative of said signal at its input terminal;
   a first demodulator with an input terminal for receiving a modulated signal and an output terminal to which is supplied a signal demodulated from said modulated signal;
   a second modulator having an input terminal for receiving a signal and an output terminal to which is supplied a modulated signal representative of said signal at its input terminal, said input terminal being connected to the output terminal of the first demodulator; and
   a second demodulator with an input terminal for receiving a modulated signal and an output terminal to which is supplied a signal demodulated from said modulated signal, said output terminal being connected to the input terminal of the first modulator;

means for closed loop testing the operation of said modulators and demodulators from the modulated signal side of the first modulator and first demodulator comprising:

means for sensing a first signal supplied to the first demodulator and producing in response thereto a test initiate signal;

means responsive to said test initiate signal for connecting the output of the second modulator to the input of the second demodulator;

means for connecting the output terminal of the first demodulator and the input terminal of the first modulator while disconnecting the first modulator and the first demodulator from the second demodulator and the second modulator, said connecting and disconnecting occurring in response to an additional test initiate signal; and means for sensing at least an additional signal supplied to the first demodulator and in response thereto restoring the terminal to normal operation.

10. The apparatus of claim 9 wherein the communication terminal is part of a frequency division multiplex (FDM) system and the first modulator and first demodulator are an FDM transmitter/receiver.

11. The apparatus of claim 9 further comprising means responsive to said test initiate signal for energizing the second modulator for operation in one of the originate or answer modes and for energizing the second demodulator for operation in the other of said originate or answer modes.

12. The apparatus of claim 9 further comprising an attenuator and means for connecting it between the output of the second modulator and the input of the second demodulator.

13. The apparatus of claim 9 wherein the means for sensing said first signal comprises means for detecting a tone signal and the means for sensing said additional signal comprises means for detecting an interruption in signals applied to the first demodulator.

14. The apparatus of claim 9 wherein the means for connecting the output terminal of the first demodulator and the input terminal of the first modulator comprises a multistate recording means to which the test initiate signals are applied and means for controlling the connection of the output terminal of the first demodulator and the input terminal of the first modulator in response to the state of said recording means.

15. The apparatus of claim 9 wherein the output terminal of the first demodulator and the input terminal of the first modulator are connected after receipt of every other test initiate signal.

16. The apparatus of claim 9 wherein the communication terminal is a data transmission terminal.

* * * * *